(12) United States Patent
Lee et al.

(10) Patent No.: US 7,642,751 B2
(45) Date of Patent: Jan. 5, 2010

(54) PREFABRICATED PCM AND BATTERY PACK CONTAINING THE SAME

(75) Inventors: Dongcheol Lee, Iksan-si (KR); Seogjin Yoon, Seoul (KR); Tae il Kim, Gwangmyeong-si (KR)

(73) Assignee: LG Chem, Ltd. (KR)

( * ) Notice: Subject to any disclaimer, the term of this patent is extended or adjusted under 35 U.S.C. 154(b) by 296 days.

(21) Appl. No.: 11/548,131

(22) Filed: Oct. 10, 2006

(65) Prior Publication Data
US 2007/0262745 A1    Nov. 15, 2007

(30) Foreign Application Priority Data
Oct. 21, 2005    (KR) ...................... 10-2005-0099869

(51) Int. Cl.
*H02J 7/00*    (2006.01)
(52) U.S. Cl. .......................... 320/134; 439/495; 429/65; 429/121
(58) Field of Classification Search ................. 320/134; 429/61, 65, 121; 439/495
See application file for complete search history.

(56) References Cited

U.S. PATENT DOCUMENTS 4,810,204 A * 3/1989 Wilson ....................... 439/343
5,813,877 A * 9/1998 Nakamura ................... 439/267
6,854,992 B2 * 2/2005 Martin et al. ................ 439/157
2004/0234848 A1 * 11/2004 Chung et al. ................ 429/181

FOREIGN PATENT DOCUMENTS

| KR | 1020040015314 | 2/2004 |
| KR | 1020040062914 | 7/2004 |
| KR | 1020050074197 | 7/2005 |

* cited by examiner

*Primary Examiner*—Patrick J Assouad
*Assistant Examiner*—Samuel Berhanu
(74) *Attorney, Agent, or Firm*—Cantor Colburn LLP

(57) ABSTRACT

Disclosed herein is a protection circuit module (PCM) including a protection circuit for controlling overcharge, overdischarge, and overcurrent of a battery. The protection circuit module includes a pair of connecting members, which are mounted to a rectangular lower end of the PCM and electrically connected to a protection circuit, and a pair of coupling members coupled to the corresponding connecting members while plate-shaped electrode terminals of a battery cell are interposed between the connecting members and the coupling members, and a battery pack including the protection circuit module, which is electrically connected to a battery cell. According to the present invention, a welding or soldering process, which requires a large amount of time and a high degree of technical skill to manufacture a battery pack, is not necessary, the coupling force between the battery cell and the PCM is increased, and the inner space of the battery pack is maximally utilized.

9 Claims, 2 Drawing Sheets

PREFABRICATED PCM AND BATTERY PACK CONTAINING THE SAME

FIELD OF THE INVENTION

The present invention relates to a protection circuit module (PCM) including a protection circuit for controlling overcharge, overdischarge, and overcurrent of a battery, and, more particularly, to a protection circuit module including a pair of connecting members, which are mounted to a rectangular lower end of the PCM and electrically connected to a protection circuit, and a pair of coupling members coupled to the corresponding connecting members while plate-shaped electrode terminals of a battery cell are interposed between the connecting members and the coupling members, and a battery pack including the protection circuit module, which is electrically connected to a battery cell.

BACKGROUND OF THE INVENTION

As mobile devices have been increasingly developed, and the demand of such mobile devices has increased, the demand of secondary batteries has also sharply increased. One of the secondary batteries is a lithium secondary battery having high energy density, high operation voltage, and excellent storage and service life characteristics, which is now widely used as an energy source for various electronic products as well as various kinds of mobile devices.

However, various combustible materials are contained in the lithium secondary battery. As a result, there is a possibility of danger in that the lithium secondary battery can be heated or explode due to overcharge, overcurrent, or any other external physical impacts. In other words, the lithium secondary battery has low safety. Consequently, a protection circuit module (PCM) for effectively controlling the abnormality of the battery, such as overcharge, is mounted in the lithium secondary battery while the PCM is connected to a battery cell of the lithium secondary battery.

The PCM includes a field effect transistor (FET), which serves as a switching element for controlling electric current, a voltage detector, and passive elements such as a resistor and a capacitor. The PCM interrupts overcharge, overdischarge, overcurrent, short circuits, and reverse voltage of the battery to prevent the explosion or the overheating of the battery, the leakage of liquid from the battery, and the degradation of the charge and discharge characteristics of the battery, and to suppress the lowering of the electrical efficiency of the battery and the abnormal physicochemical behavior of the battery, thereby eliminating dangerous factors from the battery and increasing the service life of the battery.

Generally, the PCM is connected to the battery cell using a conductive material, such as a plate, by welding or soldering, which increases a coupling force between the PCM and the battery cell. However, the welding or soldering process requires a high degree of technical skill with the result that skilled persons are needed. Also, the welding or soldering process requires large working space. Furthermore, when physical impacts are applied to the battery cell, electrical shorts may occur, and therefore, the battery cell may catch fire or explode. In other words, safety-related problems may occur.

Consequently, research on various no-welding type technologies, which can complement drawbacks of the welding or soldering process while maintaining advantages of the welding or soldering process, is being rapidly pursued. For example, Korean Unexamined Patent Publication No. 2004-0015314 discloses a structure for mounting a protection circuit to a battery cell wherein a printed circuit board, which includes a protection circuit part and a protruding contact pact, is coupled to a fixing part, which is formed by injection molding of plastic, through the coupling between the protruding contact pact and the fixing part, and then the fixing part is mounted to the battery cell. Also, Korean Unexamined Patent Publication No. 2005-0074197 discloses a structure for mounting a protection circuit to a battery cell wherein a component part, which surrounds a circuit board and has a coupling-type protrusion formed at the outer surface thereof, the protrusion being provided with a jaw, is manufactured by molding, and the component part is connected to the battery cell using the protrusion. Furthermore, Korean Unexamined Patent Publication No. 2004-0062914 discloses a structure for mounting a protection circuit to a battery cell wherein a hook is formed at the lower end case of a battery such that a terminal can be coupled to an electrode part in a hook fashion, grooves are formed at the terminals, and the protection circuit is assembled to the terminal in a hook fashion.

According to the above-described methods, additional members, which include the protection circuit, are connected to the battery cell in a coupling fashion without using the conventional welding process, whereby the problems caused from the conventional welding process are solved. However, the above-described methods are not suitable for a battery cell including various kinds of electrode terminals, such as plate-shaped electrode terminals. In addition, since the connection between the additional members including the protection circuit and the battery cell is accomplished merely in an inserting and coupling fashion, the coupling force between the additional members including the protection circuit and the battery cell is low, and therefore, a possibility that the additional members including the protection circuit is separated from the battery cell is high. Furthermore, the protection circuit and the electrode terminals are electrically connected with each other merely through the contact between the protection circuit and the electrode terminals, and therefore, the connecting force between the protection circuit and the electrode terminals is also low.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventor of the present application has discovered that, when plate-shaped electrode terminals of a battery cell are inserted into a protection circuit module (PCM), to which specific-structure connecting members and coupling members are mounted, and then the inserted electrode terminals are bent so as to constitute a battery pack, a welding or soldering process, which requires a large amount of time and a high degree of technical skill to manufacture a battery pack, is not necessary, the coupling force between the battery cell and the PCM is increased, the electrically connecting force between the electrode terminals of the battery cell and the PCM is increased, and the inner space of the battery pack is maximally utilized.

Consequently, it is an object of the present invention to provide a prefabricated PCM, to which specific-structure connecting members and coupling members are mounted.

It is another object of the present invention to provide a battery pack including the prefabricated PCM.

In accordance with one aspect of the present invention, the above and other objects can be accomplished by the provision of a protection circuit module including a protection circuit for controlling overcharge, overdischarge, and overcurrent of a battery, wherein the protection circuit module comprises: a pair of connecting members, which are mounted to a rectangular lower end of the protection circuit module and electrically connected to the protection circuit; and a pair of coupling members coupled to the corresponding connecting members while plate-shaped electrode terminals of a battery cell are interposed between the connecting members and the coupling members.

Consequently, the electrical connection and the mechanical coupling between the PCM according to the present invention and the electrode terminals are accomplished simply by coupling the coupling members to the corresponding connection members while the plate-shaped electrode terminals are disposed at the connecting members of the PCM.

The lower end of the PCM is constructed in the same rectangular structure as the end surface of the battery cell, whereby the PCM according to the present invention is coupled to the end surface of the battery cell where the electrode terminals are formed.

In a preferred embodiment, the connecting members, on which the electrode terminals of the battery cell are mounted, and the coupling members, which are coupled to the connecting members while the electrode terminals of the battery cell are mounted on the connecting members such that the coupling members surround the corresponding connecting members, are separated from each other, and the connecting members and the coupling members have coupling parts, which are constructed in a complementary structure to increase the coupling force between the connecting members and the coupling members.

The coupling parts may be formed in various shapes. For example, the coupling parts may be coupling protrusions and coupling grooves or coupling protrusions and catching jaws. In a preferred embodiment, each of the connecting members is provided at the outer surfaces of opposite sides thereof with depressions having a predetermined depth, which extend vertically, each of the connecting members having coupling protrusions formed in the depressions, each of the coupling protrusions having a downward-tapered upper end surface, and each of the coupling members is provided at the inner surfaces of opposite sides thereof with catching jaws, which correspond to the coupling protrusions, the catching jaws having a length corresponding to the width of the depressions. Consequently, while the catching jaws of the coupling member are introduced along the depressions of the connecting member, the catching jaws go over the tapered upper end surfaces (the inclined surfaces) of the coupling protrusions, and then reach the lower end surfaces of the coupling protrusions. As a result, the coupling between the coupling member and the connecting member is accomplished. According to circumstances, the lower end surfaces of the coupling protrusions may be constructed in a tapered structure corresponding to the upper end surfaces of the coupling protrusions.

The connecting members are not particularly restricted so long as the connecting members can be electrically connected to the protection circuit, and the connecting members can be coupled to the coupling members while the electrode terminals are interposed between the connecting members and the corresponding coupling members. Also, the coupling members are not particularly restricted so long as the coupling members can be coupled to the connecting members while the electrode terminals are interposed between the coupling members and the corresponding connecting members. In a specific embodiment, the connecting members are constructed in a hexahedral structure, the connecting members are disposed at opposite sides of the lower end of the protection circuit module in a pair, each of the connecting members has a metallic connection part protruding from the center thereof such that the metallic connection part is electrically connected with the corresponding electrode terminal, and each of the connecting members has coupling protrusions formed in depressions provided at the outer surfaces of opposite sides thereof such that the depressions extend vertically. The coupling members, which correspond to the connecting members, are constructed in a structure in which the coupling members surround the outer surfaces of the corresponding connecting members while the plate-shaped electrode terminals of the battery cell are in contact with metallic connection parts of the connecting members, and each of the coupling members has catching jaws formed on the inner surfaces of opposite sides thereof, the catching jaws having a length corresponding to the width of the depressions.

The coupling members are constructed in a structure in which the outer surfaces (the front surfaces) of the coupling members, in the direction in which the electrode terminals are introduced to be located on the connecting members, are open, and the opposite surfaces (the rear surfaces) of the coupling members are open or closed. Preferably, the coupling members are constructed in a structure in which the rear surfaces of the coupling members are partially or entirely closed so as to prevent the occurrence of short circuits due to the protrusion of the electrode terminals during the assembly of the battery pack or during the use of the battery pack.

Preferably, the coupling members are made generally of an electric-insulative plastic material.

The coupling between the connecting members and the coupling members may be accomplished in another exemplary structure. Each of the coupling members may be rotatably connected to one side of each of the connecting members, and each of the coupling members may be provided at the other side thereof with a coupling part for coupling each coupling member and the corresponding connecting member. Consequently, after the electrode terminals are located at the connecting members while the connecting members and the coupling members are separated from each other, the coupling members are rotated such that the corresponding coupling parts can be coupled to each other, whereby the connection between the PCM and the electrode terminals is easily accomplished.

Specifically, the connecting members are constructed in a hexahedral structure, and each of the connecting members has a metallic connection part protruding from the center thereof. The coupling members are constructed in a structure in which the coupling members surround the outer surfaces of the corresponding connecting members while the plate-shaped electrode terminals of the battery cell are in contact with metallic connection parts of the connecting members. Each of the coupling members is hingedly connected to each of the connecting members. Each of the connecting members and each of the coupling members are provided at opposite sides thereof with coupling parts, the coupling parts of each of the connecting members corresponding to the coupling parts of each of the coupling members.

In accordance with another aspect of the present invention, there is provided a battery pack including the protection circuit module, which is electrically connected to a battery cell.

According to the present invention, it is preferable that the battery cell be a pouch-shaped battery cell having an electrode assembly, which is constructed in a cathode/a separator/an anode structure, mounted in a pouch-shaped battery case made of a laminated sheet including a resin layer and a metal layer.

The PCM may be mounted to the battery cell in various manners. For example, an upper sealing part (a terrace part) of the battery cell, at which the PCM is mounted, is bent vertically upward while electrode terminals of the battery cell are connected to the PCM, and then the PCM is bent vertically downward, whereby the protection circuit module is mounted to the battery cell.

BRIEF DESCRIPTION OF THE DRAWINGS

The above and other objects, features and other advantages of the present invention will be more clearly understood from the following detailed description taken in conjunction with the accompanying drawings, in which.

Figure 1:
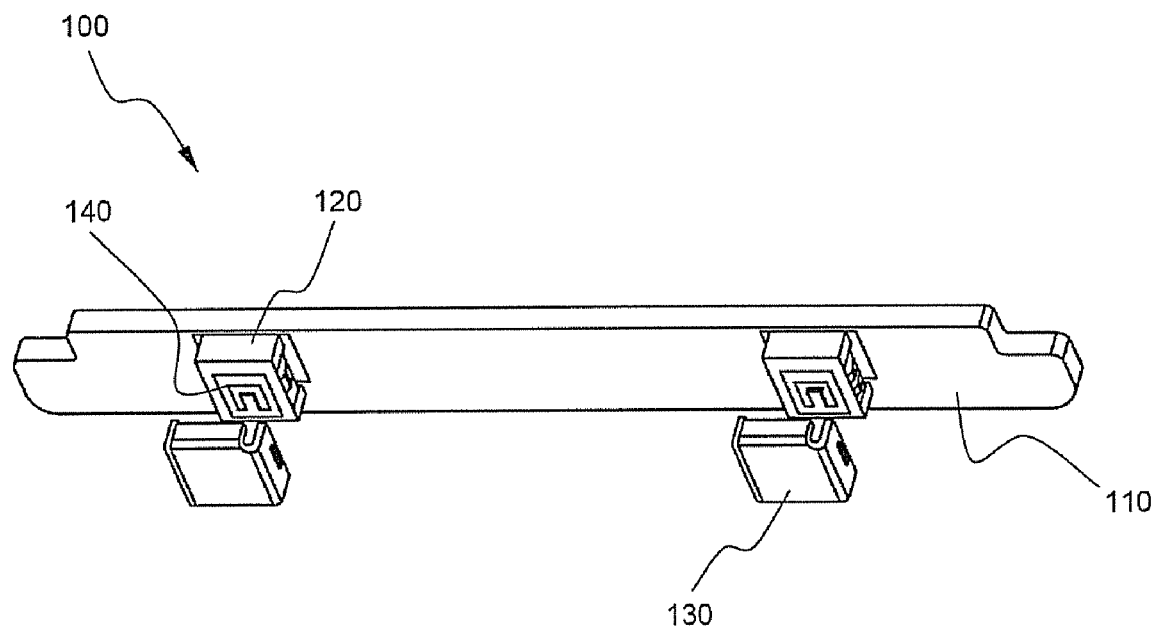
FIGS. 1 and 2 are perspective views illustrating a prefabricated protection circuit module (PCM) according to a preferred embodiment of the present invention before and after coupling members are coupled, respectively.

<Description of Main Reference Numerals of the Drawings>

| 100: protection circuit module (PCM) | 200: battery cell |
|---|---|
| 120: connecting member | 130: coupling member |
| 140: connection part | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
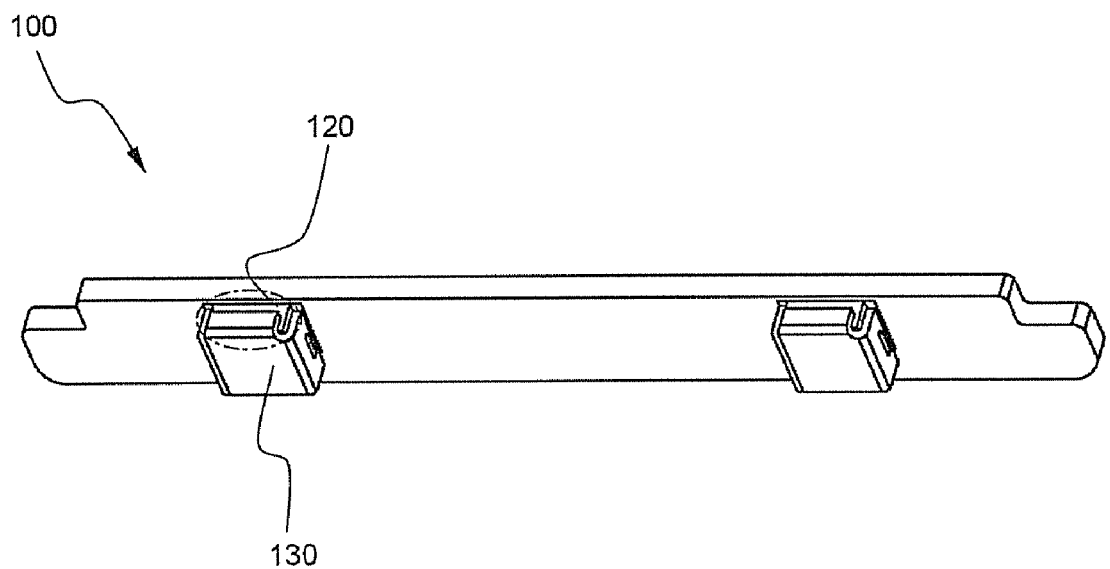

FIGS. 1 and 2 are perspective views illustrating a prefabricated protection circuit module (PCM) according to a preferred embodiment of the present invention before and after coupling members are coupled, respectively.

Referring to these drawings, the PCM 100 is formed in a printed circuit board (PCB) structure in which a protection circuit (not shown) for controlling overcharge, overdischarge, and overcurrent of a battery is printed to a rectangular-structure epoxy composite body.

At the lower end 110 of the PCM 100 are formed connecting members 120, which are electrically connected to the protection circuit. Coupling members 130 are structural bodies, which are coupled to the connecting members 120 while electrode terminals (not shown) are interposed between the connecting members 120 and the coupling members 130.

The connecting members 120 are constructed generally in a hexahedral structure. The connecting members 120 are formed adjacent to opposite sides of the lower end 110 of the PCM 100 in a pair. From the center of each connecting member 120 protrudes a metallic connection part 140, which is electrically connected with the corresponding electrode terminal (not shown).

The electrode terminals are introduced from the rear of the drawing, and are then mounted on the connecting members 120. The coupling members 130 are constructed in a structure in which the surfaces of the coupling members 130 opposite to the direction in which the electrode terminals are mounted, i.e., the front surfaces of the coupling members 130, are partially closed. Consequently, the ends of the electrode terminals do not protrude toward the side opposite to the direction in which the electrode terminals are introduced, with the result that a possibility of short circuits due to the contact between the electrode terminals and other elements is maximally prevented.

Figure 3:
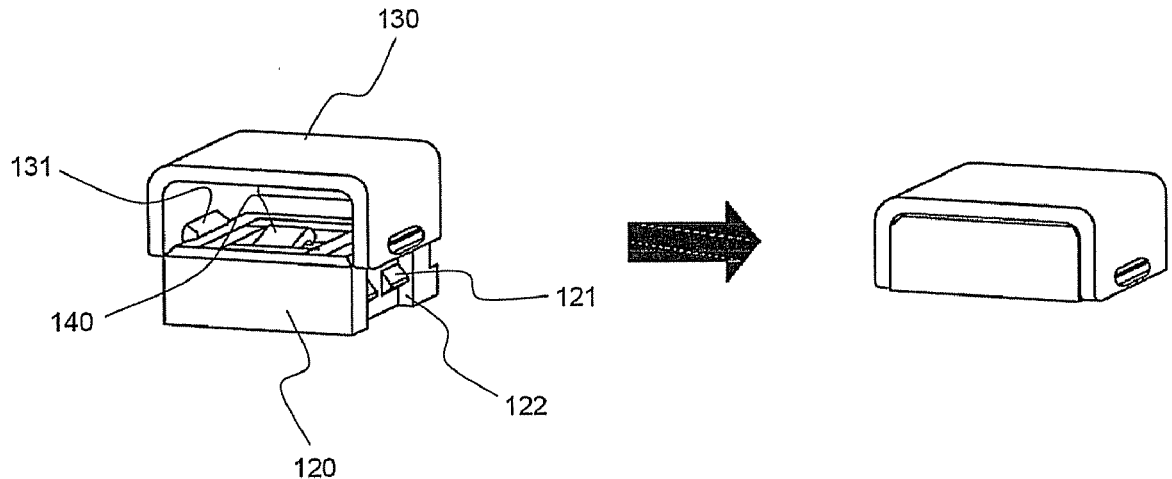
FIG. 3 is a perspective view illustrating coupling between a connecting member and a coupling member according to a preferred embodiment of the present invention.

FIG. 3 is a perspective view illustrating coupling between a connecting member and a coupling member according to a preferred embodiment of the present invention.

Referring to FIG. 3, the coupling between the connecting member 120 and the coupling member 130 at the PCM (not shown) is accomplished by the engagement of coupling protrusions 121 and catching jaws 131.

Depressions 122 having a predetermined depth are formed at the outer surfaces of opposite sides of the connecting member 120 in the direction in which the corresponding electrode terminal is introduced (in the front of the drawing) such that the depressions 122 extend vertically. The coupling protrusions 121 are formed in the depressions 122. The upper end surface of each coupling protrusion 121 is tapered downward, and the lower end surface of each coupling protrusion 121 is tapered upward.

On the other hand, the catching jaws 131 protrude from the inner surfaces of opposite sides of the coupling member 120 at positions corresponding to the coupling protrusions 121. The catching jaws 131 have a length equal to or less than the width of the depressions 122.

In order to couple the coupling member 130 to the connecting member 120 while the electrode terminals (not shown) are mounted on the connecting member 120, it is required that the catching jaws 131 of the coupling member 130 enter the depressions 122 of the connecting member 120. Consequently, correct positions of the catching jaws 131 for the coupling are naturally decided. Subsequently, the catching jaws 131 go over the tapered upper end surfaces of the coupling protrusions 121, and then reach the tapered lower end surfaces of the coupling protrusions 121. As a result, the coupling between the coupling member 130 and the connecting member 120 is accomplished.

On the other hand, the metallic connection part 140, which is electrically connected to the protection circuit (not shown) of the PCM, protrudes from the center of the connecting member 120. Consequently, the metallic connection part 140 is electrically connected to the protection circuit (not shown) of the PCM when the corresponding electrode terminal is mounted on the connecting member 120.

The catching jaws 131 are engaged with the corresponding coupling protrusions 121 through the above-described process, and, as a result, the coupling of the coupling member 130 to the connecting member 120 is stably accomplished. During this process, the corresponding electrode terminal is electrically connected to the protection circuit via the metallic connection part 140.

Figure 4:
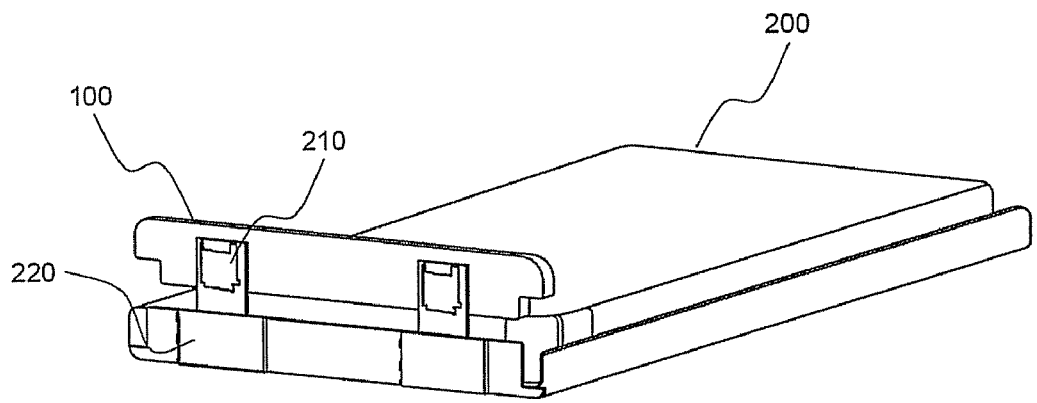
FIGS. 4 and 5 are typical views illustrating a process for assembling the PCM, according to the preferred embodiment of the present invention, with a battery cell so as to constitute a battery pack.
Figure 5:
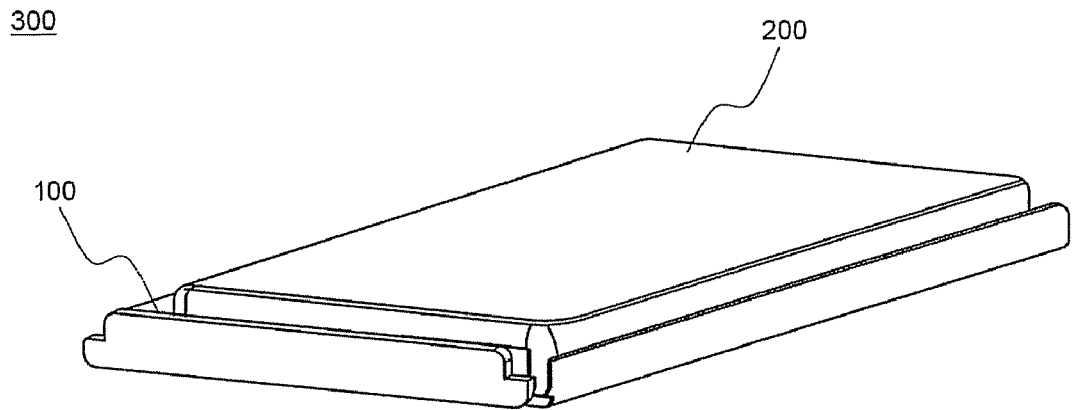

FIGS. 4 and 5 are typical views illustrating a process for assembling the PCM, according to the preferred embodiment of the present invention, with a battery cell so as to constitute a battery pack.

Referring to these drawings, the PCM 100 is coupled to electrode terminals 210 of a battery cell 200 according to the same process as described above, and then a sealing part 220 of the battery cell 200, at which the PCM 100 is mounted, is bent vertically upward. Subsequently, only the PCM 100 is bent vertically downward. As a result, a battery pack 300 is manufactured. Alternatively, the sealing part 220, from which the electrode terminals 210 of the battery cell 200 protrude, may be bent before the PCM 100 is mounted to the battery cell 200.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the fabricated PCM according to the present invention has several effects. A welding or soldering process, which requires a large amount of time and a high degree of technical skill to manufacture a battery pack, is not necessary, the coupling force between the battery cell and the PCM is increased, and the inner space of the battery pack is maximally utilized.

What is claimed is:

1. A battery pack including a battery cell and a protection circuit module, in which the protection circuit module is electrically connected to the battery cell and includes a protection circuit for controlling overcharge, overdischarge, and overcurrent of a battery, wherein the protection circuit module comprises:
   a pair of connecting members, which are mounted to a rectangular lower end of the protection circuit module and electrically connected to the protection circuit; and
   a pair of coupling members coupled to the corresponding connecting members while plate-shaped electrode terminals of the battery cell are interposed between the connecting members and the coupling members,
   wherein the connecting members are detachably coupled to the coupling members in such a way that the coupling members surround the corresponding connecting members, with the electrode terminal interposed in-between, and
   the connecting members and the coupling members have coupling parts, which are constructed in a complementary structure to increase the coupling force between the connecting members and the coupling members.

2. The battery pack according to claim 1, wherein the coupling parts include coupling protrusions and coupling grooves or coupling protrusions and catching jaws.

3. The battery pack according to claim 1, wherein
   each of the connecting members is provided at opposite inner surfaces thereof with depressions having a predetermined depth, which extend vertically, each of the connecting members having coupling protrusions formed in the depressions, each of the coupling protrusions having a downward-tapered upper end surface, and
   each of the coupling members is provided at opposite inner surfaces thereof with catching jaws, which correspond to the coupling protrusions, the catching jaws having a length corresponding to the width of the depressions.

4. The battery pack according to claim 1, wherein:
   the connecting members are constructed in a hexahedral structure, the connecting members are disposed at opposite sides of the lower end of the protection circuit module in a pair, each of the connecting members has a metallic connection part protruding from the center thereof such that the metallic connection part is electrically connected with the corresponding electrode terminal, and each of the connecting members has coupling protrusions formed in depressions provided at opposite outer surfaces thereof such that the depressions extend vertically; and
   the coupling members are constructed in a structure in which the coupling members surround the outer surfaces of the corresponding connecting members while the plate-shaped electrode terminals of the battery cell are in contact with the metallic connection parts of the connecting members, and each of the coupling members has catching jaws formed on opposite inner surfaces thereof, the catching jaws having a length corresponding to the width of the depressions.

5. The battery pack according to claim 1, wherein the coupling members are constructed in a structure in which the outer surfaces of the coupling members, opposite to the direction in which the electrode terminals are introduced to be located on the connecting members, are partially or entirely closed.

6. The battery pack according to claim 1, wherein
   each of the coupling members is rotatably connected to one side of each of the connecting members, and
   each of the coupling members is provided at the other side thereof with a coupling part for coupling each coupling member and the corresponding connecting member.

7. The battery pack according to claim 1, wherein:
   the connecting members are constructed in a hexahedral structure, and each of the connecting members has a metallic connection part protruding from the center thereof;
   the coupling members are constructed in a structure in which the coupling members surround the outer surfaces of the corresponding connecting members while the plate-shaped electrode terminals of the battery cell are in contact with the metallic connection parts of the connecting members;
   each of the coupling members is hingedly connected to each of the connecting members at one side of each of the connecting members; and
   each of the connecting members and each of the coupling members are provided at opposite sides thereof with coupling parts, the coupling parts of each of the connecting members corresponding to the coupling parts of each of the coupling members.

8. The battery pack according to claim 1, wherein the battery cell is a battery cell having an electrode assembly, which is constructed in a cathode/a separator/an anode structure, mounted in a pouch-shaped battery case made of a laminated sheet including a resin layer and a metal layer.

9. The battery pack according to claim 1, wherein an upper sealing part (a terrace part) of the battery cell, at which the protection circuit module is mounted, is bent vertically upward while electrode terminals of the battery cell are connected to the protection circuit module, and then the protection circuit module is bent vertically downward, whereby the protection circuit module is mounted to the battery cell.

* * * * *